April 23, 1963     D. E. SUNSTEIN     3,086,422
RADIATION DETECTING DEVICES
Filed Oct. 4, 1955     2 Sheets-Sheet 2
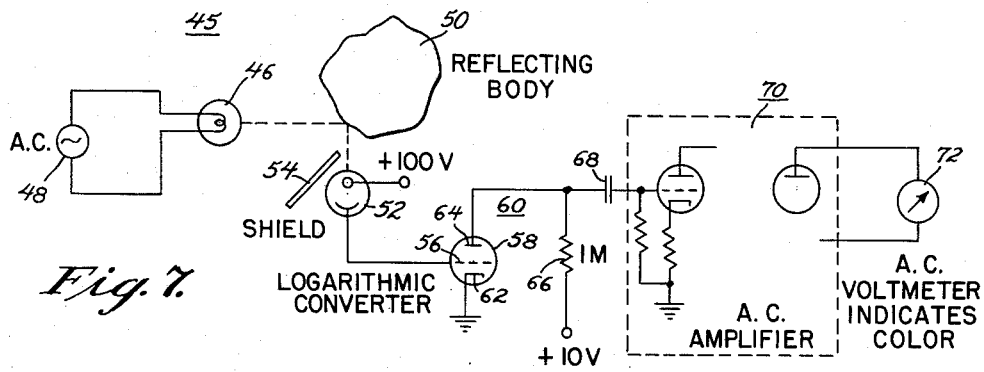
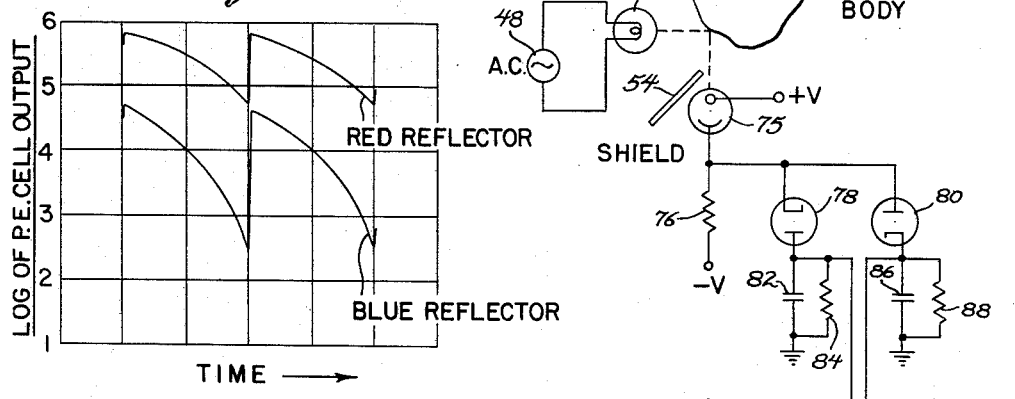
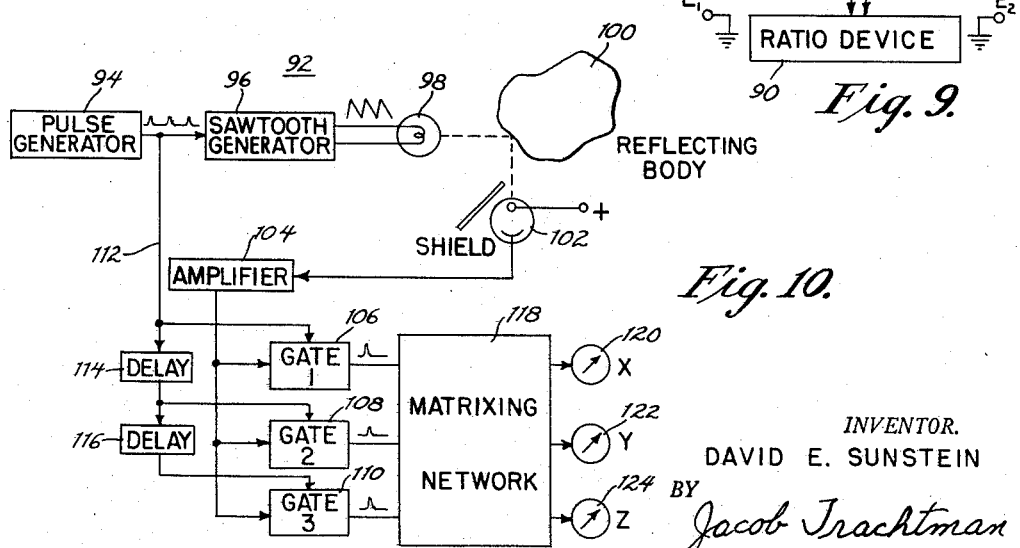
INVENTOR.
DAVID E. SUNSTEIN
BY Jacob Trachtman
ATTORNEY.

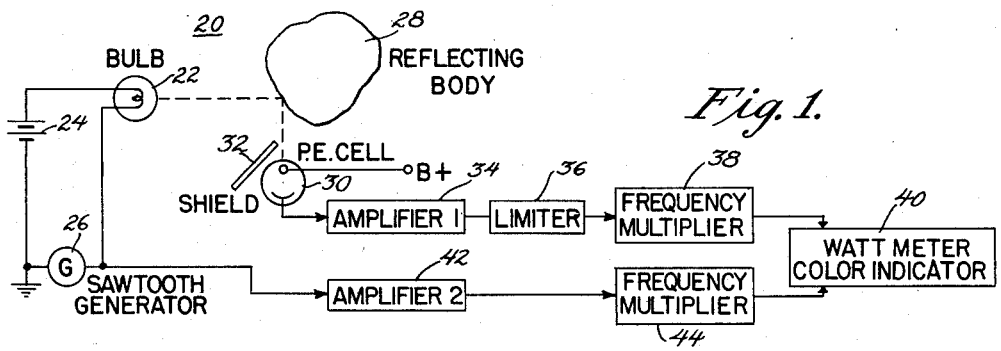
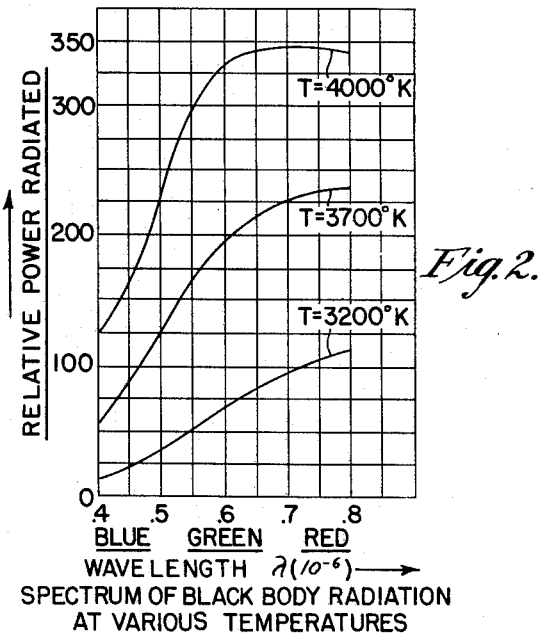
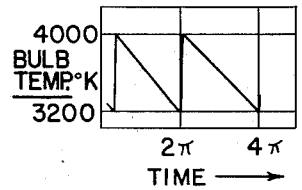
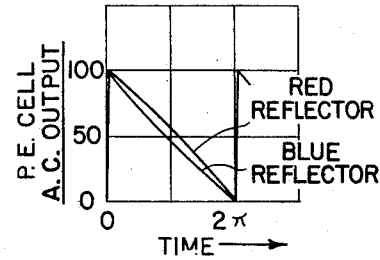
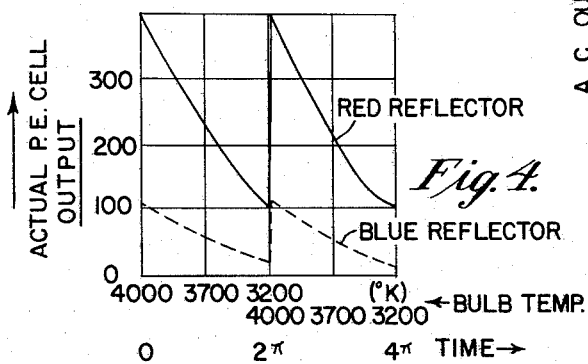
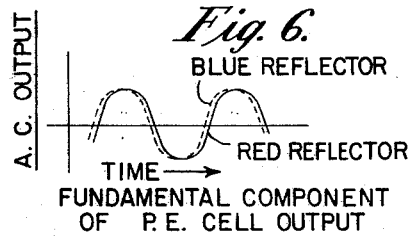

United States Patent Office 3,086,422
Patented Apr. 23, 1963

3,086,422
RADIATION DETECTING DEVICES
David E. Sunstein, 464 Conshohocken State Road,
Bala-Cynwyd, Pa.
Filed Oct. 4, 1955, Ser. No. 538,408
18 Claims. (Cl. 88—14)

This invention relates to frequency distribution detecting devices, and more particularly to color detecting devices.

Heretofore, color detecting devices have utilized a single light source and several photoelectric cells each excited by a particular color. The comparison of the color intensities received by the cells was used to determine the color of the particular reflector. The use of several photoelectric cells for determining the relative intensities of frequencies of the tested color is unreliable due to the drift caused by the aging of the photo-cells and other such factors.

It is therefore a primary object of the invention to provide a new and improved radiation detecting device which is highly stable and reliable in operation.

Another object of the invention is to provide a new and improved radiation detecting device which is highly sensitive.

Yet another object of the invention is to provide a new and improved radiation detecting device which is efficient in operation and requires a minimum number of components.

Still a further object of the invention is to provide a new and improved radiation detecting device which may accurately determine the intensity of respective frequencies of radiated energy over a predetermined range.

A further object of the invention is to provide a new and improved radiation detecting device providing information in any number of coordinates.

A yet further object of the invention is to provide a new and improved radiation detecting device which is particularly adapted for determining the frequency transmitting characteristics of various materials.

Still a further object of the invention is to provide a new and improved radiation detecting device which is particularly applicable to industrial uses.

Another object of the invention is to provide a new and improved radiation detecting device for indicating color band relationships and intensity distributions.

Yet another object of the invention is to provide a new and improved radiation detecting device which is inexpensively manufactured and maintained in operation.

The above objects of the invention as well as many other objects will become apparent when the following description of the invention is read in conjunction with the drawings, in which:

FIGURE 1 schematically illustrates a color detecting device embodying the invention, FIGURE 2 graphically illustrates the relative power radiated by a black body at various temperatures with respect to radiation wavelength over the luminous range, FIGURE 3 graphically illustrates the cyclical variations of bulb filament temperature with time, FIGURE 4 graphically illustrates the respective photoelectric cell output signals for red and blue reflectors as a function of time or bulb temperature, FIGURE 5 graphically illustrates the variations in wave forms of the cell output signals for red and blue reflectors, FIGURE 6 graphically illustrates the phase shift of the fundamental components of the red and blue reflector signals illustrated in FIGURE 5, FIGURE 7 schematically illustrates a radiation detecting device of modified form utilizing a logarithmic converter for color detection, FIGURE 8 graphically illustrates the logarithmic values of the photoelectric cell outputs for red and blue reflectors corresponding to the saw wave signals shown in FIGURE 4, FIGURE 9 is a schematic representation of a color detecting device utilizing the maximum and minimum values of the photo-cell signals for color determination, and FIGURE 10 represents in block form a color detecting device for determining colors in any predetermined number of co-ordinates.

The objects of the invention are carried out by providing a radiation detecting device which has a source of radiant energy with frequencies extending over a predetermined range, control means for affecting the distribution of intensities of respective frequencies of radiant energy as a function of time in a predetermined cyclical pattern, and detecting means for receiving radiant energy affected by the cyclical pattern of the control means.

The radiant energy of the source is adapted for interception and transmission by a test material affecting the relative intensities of respective frequencies in a manner characteristic of the material. The detecting means is responsive to the intensities of the frequencies of the radiant energy as a function of time and determines the selective frequency transmitting characteristics for the particular material intercepting the radiant energy.

Like numerals throughout the several views designate like parts.

Refer to FIGURE 1 which schematically illustrates a detecting device 20 embodying the invention. The detecting device 20 illustrated, is particularly adapted for determining the frequency distribution of radiation within the luminous range. An electric filamentary bulb 22 is provided which radiates energy having frequencies extending over the luminous range. The graphs of FIGURE 2 may be considered to sufficiently indicate the power radiated for the various frequencies over the luminous range by the bulb 22 for the temperatures shown.

The filament of the bulb 22 is connected with a battery 24 and a saw tooth generator 26. The resulting excitation of the filament of the bulb 22 results in the variation of its temperature as illustrated by the graph of FIGURE 3.

The radiant energy from the bulb 22 is adapted for interception by a body 28 which selectively transmits certain of said frequencies and alters the intensities of other frequencies of the radiant energy in accordance with the characteristics of the particular materials of body 28. The body 28 may be a transparent or a reflecting body or may otherwise interact with the intercepted radiation in a characteristic manner.

A photoelectric cell 30 or any other such device sensitive to radiant energy is adapted to receive radiation which is first intercepted and transmitted by the body 28. A shield 32 prevents direct receipt by the cell 30 of radiant energy from the bulb 22.

Refer to the graph of FIGURE 4 which shows the signal output from the photoelectric cell 30 when the body 28 is a red reflector as well as when a blue reflector is used (shown by dashed lines).

The graph of FIGURE 5 emphasizes the difference in the wave forms of the output signals from the photoelectric cell 30 when the body 28 is respectively a red reflector and a blue reflector.

The wave forms of FIGURE 6 illustrate the phase shift between the fundamental components of the red and blue reflector signals which are shown in FIGURE 5.

The signal developed by the photoelectric cell 30 is delivered to an amplifier 34 which delivers at its output a signal which is substantially the fundamental component of the input signal. This output signal may be passed through an amplitude limiter 36 which delivers it to a frequency multiplier 38.

The frequency multiplier 38 may have five stages so that the incoming signal has its frequency increased by a factor of 32. The signal from the frequency multiplier 38 is received by a phase detector 40 which may be a watt meter.

A phase reference signal is derived from the saw tooth generator 26 and passed through an amplifier 42 which is tuned to the fundamental component. The signal from the amplifier 42 is passed through a frequency multiplier 44 which may be identical with the multiplier 38. Thus a phase reference signal having a frequency equal to that of the output signal from the multiplier 38, is also delivered to the phase detector 40.

The frequency multiplier 44 may also be provided with well known means for shifting the phase of its output signal with respect to the output signal of the frequency multiplier 38.

In operation the color detecting device 20, for example, may have its generator 26 operating at a frequency of ten cycles per second. The bulb 22 may be operated with its filament varying between the temperatures of the 3200 degrees and 4000 degrees Kelvin as shown by the graph of FIGURE 3. The radiation intercepting body 28, for example, may be the human blood stream, peas, or objects which may be traveling along a conveyor belt.

The signal received by the photoelectric cell 30 is affected by the cyclical pattern by which the bulb 22 is energized and the frequency selecting characteristics of the body 28. The signal delivered by the output of the cell 30 corresponds to the intensity of radiation which is received as a function of time. It is noted (FIGURES 5 and 6) that the phase of the received signal depends upon the selected frequency characteristic of the body 28. Thus, if the body 28 is a red reflector, its fundamental component will lag behind the fundamental component derived from a signal produced by a blue reflector.

Since only the phase of the signal is of importance in the instant case in determining the frequencies of radiation received by cell 30, the limiter 36 is used to maintain the amplitude of the derived signals constant.

Because the phase shift of the red and blue reflector signals and other intermediate signals is very slight, the multiplier 38 may be utilized to multiply the phase shift with respect to the reference signal from the generator 26. Thus, the frequency multiplier 38 which receives the ten cycle per second signal delivers an output signal of 320 cycles per second. The phase of the signal from the multiplier 38 is compared with the phase of the reference signal from the multiplier 44 by the phase detector 40.

When the device 20, for example, is to be used for determining whether an article such as a pea is acceptable by its color, the phase of the signals to the detector 40 may be adjusted to be in quadrature for the color which is intermediate the acceptable and unacceptable colors. At quadrature the phase detector in the form of a watt meter would show a zero reading. Any deflection in one direction from the quadrature position would indicate an acceptable article, while a deflection in the other direction would indicate an object which is rejected.

While only a particular example of the utility of the device 10 has been given in detail, it will be obvious that the detecting device 20 has a great many other and varied uses.

Refer now to FIGURE 7 which illustrates in schematic form a modified detecting device 45 for determining the frequency distribution of radiant energy. Since the description and operation of the device 45 is in many respects similar to that of the device 20, certain aspects of the disclosure given in connection with the device 20 will also be applicable to the device 45.

The illustrated radiation detecting device 45 is particularly adapted for determining the frequency distribution of radiant energy over the luminous range. The device 45 comprises an electric bulb 46 having a filament energized by an alternating current generator 48.

The radiation from the bulb 46 is adapted for interception and transmission by a body 50 which modifies the intercepted radiant energy in accordance with the characteristics of its material.

A photoelectric cell 52 receives the radiant energy transmitted by the body 50, while being shielded against direct radiation from the bulb 46 by a cover 54. The output from the photoelectric cells 52 is delivered to the control electrode 56 of a triode valve 58 of a logarithmic convertor circuit 60.

The cathode 62 of the valve 58 is returned to ground potential while its anode 64 is connected to a positive potential of 10 volts through a load resistor 66. The anode 64 of the valve 58 is also coupled by a capacitor 68 with an alternating current amplifier 70 which delivers its output signal to an alternating current volt meter 72 for indicating color.

Although the bulb 46 is energized by an alternating current generator 48, the device 45 would also operate with the saw tooth energizing signal utilized by the device 20.

In operation the device 45 has its bulb 46 energized so that it cyclically varies the relative intensities of the frequencies radiated in a predetermined pattern. The body 50 intercepts the radiation and transmits it to the cell 52 after affecting the radiation in the manner already described.

The cell 52 develops an output signal responsive to the intensity of radiation received which is delivered to the control electrode 56 of the valve 58 of the logarithmic converter 60.

The control electrode 56 of the valve is operated near zero bias. Under these conditions, the voltages on the control electrode 56 will be substantially proportional to the logarithm of the control electrode currents due to the Maxwellian distribution of the velocities of emitted electrons. This results in a current at the anode 64 of valve 58 which is proportional to the logarithm of the photocell current. Thus, the current variations at the anode 64 of valve 58 are shown by the wave forms of FIGURE 8 when the bulb 46 is energized by a saw tooth valve.

It is noted that the amplitude of the alternating signal produced for the red reflector is smaller than the amplitude of the alternating signal corresponding to the blue reflector. It is also noted that the amplitudes of the alternating signals from the converter 60 each corresponds to the difference of the logarithms of the maximum and minimum values of the alternating signal produced by the cell 52. The amplitudes of the converter signals therefore each represent the ratio of the maximum to minimum values of the respective signals derived from the cell 52.

The amplitude of the red reflector signal derived from the converter 60 is smaller than the amplitude of the blue reflector signal. This agrees with the ratios of the maximum and minimum signal values for blue and red radiation illustrated in the graph of FIGURE 2.

The alternating current volt meter readings of the signals derived from the amplifier 70 may thus be used to indicate the relative intensities of the colors received by the cell 52.

The device 45 may be utilized in a manner similar to that of the device 20 for indicating relative color intensities and distribution. It is noted however that the device 45 does not require a saw tooth generator nor is a reference signal required from the bulb excitation source, which may be desired for remote operation.

The device 45 also utilizes simple circuitry with only one amplifier and a simple volt meter for color indication.

Refer now to FIGURE 9 which shows in schematic form a color detecting device 74 which is a modification of the device 45 providing a photoelectric cell 75 which has its anode connected to a positive potential and its cathode returned through a load resistor 76 to a negative potential. The cathode of cell 75 is also connected to the cathode of a diode valve 78 and to the anode of a diode valve 80. The anode of the diode valve 78 is linked to ground by a signal storing capacitor 82 which is shunted by a load resistor 84, while the cathode of the diode valve 80 is bridged to ground by the signal storing capacitor 86 which is shunted by a load resistor 88.

The signal ($E_1$) developed at the anode of the valve 78 and the signal ($E_2$) developed at the cathode of the valve 80 are each delivered to a ratio device 90. The device 90, for example, may be an analog to digital converter with a digital multiplier-divider circuit for delivering an output signal ($E_2/E_1$) which is the ratio of the signals delivered to the device 90.

In operation the signal at the cathode of the photoelectric cell 75 will vary above and below ground potential depending upon the intensity of radiation received by the cell 75. When the cathode of cell 75 is above ground or at a positive potential, the diode 80 will conduct and charge the capacitor 86, while when the signal is below ground potential the valve 78 will become conductive producing a negative signal at the anode of the valve 78. Thus the negative signal at the anode of valve 78 and the positive signal developed at the cathode of valve 80 respectively represents the minimum and maximum values attained by the varying output signal from the cell 75. To accomplish the above results, it is preferred that the values of the resistors 84 and 88 be large with respect to the load resistor 76 of the cell 75. The time constant of the resistor-capacitor combinations 82, 84 and 86, 88 should be long with respect to the frequency of the signal received by the cell 75. Thus, if the photo-cell signal frequency is 40 cycles per second, a time constant of one second would be satisfactory. This would result from capacitors 82, 86 of one microfarad in combination with resistors 84, 86 of one megohm. The photo-cell load resistor 76, if it had a resistance less than one hundred thousand ohms or, for example, approximately ten thousand ohms would be satisfactory in this case.

The ratio device 90 receiving the minimum and maximum voltages ($E_1$ and $E_2$) would deliver a signal representing the ratio of these values which as has been shown in connection with the device 45 of FIGURE 7 would be indicative of the relative intensities of the frequencies or bands of frequencies received by the photoelectric cell 75.

The device 74 may be utilized in a manner similar to that of the device 45, and is particularly useful where the information regarding the minimum and maximum values of the signal received by the photo-cell 75 is desired in either the analog or digital form.

Refer to FIGURE 10 which discloses in block form a color detecting device 92. The detecting device 92 delivers information in any number of co-ordinates regarding the distribution of the frequencies of radiant energy over a predetermined range.

The device 92 comprises a pulse generator 94 which, for example, may produce signals at the rate of 10 pulses per second. The pulse generator 94 drives a saw tooth generator 96 which delivers its output signal to the filament of an electric bulb 98. The radiation produced by the electric bulb 98 is characterized by the cyclical variation of intensities of its frequencies over the luminous range as previously described.

A body 100 intercepts and transmits radiant energy from the bulb 98 which is thereafter received by the photoelectric cell 102. The body 100 affects the radiation by altering the intensity and selectively transmitting certain frequencies in accordance with the characteristics of its material.

The signal developed by the photoelectric cell 102 is increased by the amplifier 104 and delivered to the gates 106, 108 and 110.

The gates 106, 108 and 110 pass a signal from the photo-cell 102 only when they receive a gating pulse from the pulse generator 94. Thus a pulse from the generator 94 received over line 112 allows the gate 106 to deliver an output signal to a matrixing network 118. The pulse from line 112 also passes through a delay 114 and arrives at gate 108 at a predetermined later time within the period of one cycle of the saw tooth generator 96. The gate 108, at this time allows the delivery to the matrixing network 118 of the signal currently produced by the cell 102.

The pulse signal from the delay 114 also passes through a delay 116 and arrives at a still later time during the cycle at the gate 110. This allows receipt by the matrixing network 118 of the signal currently developed by the cell 102.

By means of the gates 106, 108 and 110 the matrixing network 118 receives three signals derived at different time intervals during one cycle of the saw tooth generator 96. Of course the number of gating circuits may be increased to present a larger number of individual samples to the matrixing network during the cycle. This would result in a matrixing network having a greater number of inputs and allow greater variability, adaptability and accuracy.

The matrixing network 118 illustrated delivers information in three co-ordinates which is indicated by the meters 120, 122, and 124. Of course a matrixing network may be utilized which will deliver information in any number of co-ordinates desired.

In operation, the intensities of the frequencies radiated by the bulb 98 is varied in accordance with the saw tooth excitation, and is reflected by the body 100 before it is received by the photoelectric cell 102. The variations of intensities of the signals received by the cell 102 during the excitation cycle of the bulb 98 have already been considered in detail.

This signal after it is amplified is sampled at various times during the cycle by the gates 106, 108 and 110. This information is delivered to the matrixing network 118 which can be adjusted to indicate the color received by the cell 102 in three co-ordinates X, Y, Z as respectively read on the meters 120, 122, 124. This is so, even though the cell 102 is not sensitive to color but to the intensity of radiation received thereby. This is due to the time factor in the color distribution affected by the saw tooth excitation of the bulb 98. Thus the color radiated by the bulb 98 will be more intense during a particular time in the cycle than during another time. By sampling the intensity of the received signal at the cell 102 a corresponding relation is established between the intensity of the color frequency radiated by the bulb 90, and the intensity received by the cell 102 at that time. The effect of the intercepting body 100 can be detected by its characteristic effect. The matrixing network 118 is adjusted so that the signal received through each of the gates has the appropriate affect on the co-ordinate readings so that these readings determine the transmitting characteristic or color of any tested body 100.

The matrixing network which in effect evaluates the information received at each of its inputs and distributes excitation in the proper proportions to the X, Y, and Z, indicating meters according to predetermined coefficients, is commonly found in the art and therefore need not be described in detail. As an example of a matrixing device, box car generators well known to the art are used to store signals received at various times from the gates 106, 108 and 110. These box car generators then represent three voltages which can be considered substantially constant for the time of the matrixing operation. The matrixing operation combines these three signals by appropriate additions and subtractions with predetermined weighing functions to produce the output signals representing the tristimulus color values of the material of the intercepting body. These values can be read on three direct current meters 120, 122 and 124 representing the coordinates X, Y and Z.

While the device 92 is in certain respects more complex than the other illustrated detecting devices, it is of great utility when the determination of the reflecting or transmitting characteristics of a material is desired with greater accuracy. For this purpose, the art has developed a number of coordinates of which three (X, Y, Z) are commonly used for the purpose of indicating the variations in color or intensity distribution of frequencies over a given range.

Although the radiation detecting devices illustrated herein have been particularly adapted for action in the range of luminous radiation, the invention may with appropriate modification be used in the infrared, ultraviolet, radio frequency and other radiant energy frequency ranges.

While only a few represented embodiments of the invention disclosed herein have been outlined in detail, there will be obvious to those skilled in the art, many modifications and variations accomplishing the foregoing objects and realizing all of the advantages, but which do not depart essentially from the spirit of the invention.

What is claimed is:

1. A color detecting device for radiant energy comprising a source of radiant energy, control means for periodically affecting the relative intensities of the frequencies of said radiant energy, and detecting means for continuously instantly sensing the instantaneous total intensity of said radiant energy and receiving a reference signal from said control means for being responsive to the variations in the total intensity of the frequencies of said radiant energy.

2. A device for detecting the color of a material comprising a source of radiant energy with frequencies corresponding to color bands extending over the luminous range, control means for affecting the relative intensities of respective color bands as a function of time in a predetermined cyclical pattern, the radiant energy of said source being directed for interception and transmission by a material which is to have its color detected, said material affecting the relative intensities of said color bands in a manner characteristic of said material, and detecting means for receiving and concurrently sensing the spectrum of radiant energy affected by the cyclical pattern of said control means and the selective frequency transmitting characteristics of the particular material intercepting said radiant energy, means delivering a phase reference signal from said control means to said detecting means, said detecting means comparing the phase reference signal from said control means with said received radiant energy for determining the color band transmitting characteristics of said particular material.

3. A color detecting device comprising an electric light bulb for providing radiant energy with frequencies corresponding to color bands extending over the luminous range; a saw tooth generator connected with said bulb for affecting the relative intensities of respective color bands; the radiant energy of said bulb being directed for interception and transmission by a material affecting the relative intensities of said color bands in a manner characteristic of said material; and color detecting means comprising a photoelectric cell adapted for receiving and concurrently sensing the spectrum of radiant energy from said bulb affected by said generator and the selective frequency transmitting characteristics of the particular material intercepting said radiant energy, and a phase detector having a first input connected with and energized by said cell and a second input connected with and deriving a phase reference signal from said generator for determining the color band transmitting characteristic of said particular material.

4. A color detecting device comprising an electric light bulb for providing radiant energy with frequencies corresponding to color bands extending over the luminous range; a saw tooth generator connected with said bulb for cyclically varying the relative intensities of respective color bands; the radiant energy of said bulb being directed for interception and transmission by a material affecting the relative intensities of said color bands in a manner characteristic of said material; and color detecting means comprising a photoelectric cell adapted for receiving and concurrently sensing the spectrum of radiant energy from said bulb affected by said generator and the selective frequency transmitting characteristics of the particular material intercepting said radiant energy; a first frequency multiplier connected with and excited by said cell, a second frequency multiplier connected with and deriving a phase reference signal from said generator, and a phase detector energized by the output signal from said multipliers.

5. In a color detecting system, a source of radiation, means for cyclically varying the intensity of the spectrum of said source, a receiver for continuously receiving and instantly sensing the instantaneous total intensity of radiation from said source, means for comparing the cyclical variations of intensity of received radiation with the variations of the total intensity of radiation of said source so as to produce a signal dependent upon the relative ease of transmission of waves of different parts of the spectrum between said source and said receiver.

6. In a color detecting system, means providing a modulation signal, a source of radiation, means for periodically varying both the amplitude and relative frequency distribution of said source by said modulation signal, a receiver continuously responsive to and instantly sensing the instantaneous total intensity of a band of frequencies included in said radiation to produce an output dependent upon the amplitude of received signals, and means for phase comparing the output of said receiver with said modulation signal to produce a second signal dependent upon the frequency response of the path between said source and said receiver and independent of the amplitude modulation of said source.

7. In a color detecting system, means providing a cyclical modulation signal, a source of radiation, means for periodically varying both the amplitude and relative frequency distribution of said source by said modulation signal, a detector continuously responsive to and instantly sensing the instantaneous total intensity of a band of frequencies included in said radiation to produce an output dependent upon the amplitude of received signals, and means for comparing with said modulation signal the output of said detector at different parts of the cycle of said modulation signal to produce a signal dependent upon the frequency response of the path between said source and said receiver and independent of the amplitude modulation of said source.

8. The method of determining the color and spectral selectivity of an object which comprises illuminating said object with radiation the spectrum of which changes with time, continuously receiving and instantly sensing the instantaneous total intensity of radiation from said object by a detector, and measuring the form of the time variation of the output of said detector.

9. A color detecting device for radiant energy comprising a source of radiant energy with frequencies extending over a predetermined range, means providing a control signal, means operated by said control signal for affecting the distribution of relative intensities of respective frequencies of said radiant energy as a function of time in a predetermined cyclical pattern, and detecting means for continuously receiving and instantly sensing the instantaneous total intensity of radiant energy affected by the cyclical pattern induced by said control signal upon said means, and being responsive to changes in the variation of the sum of the intensities of the respective frequencies of said radiant energy as a function of time.

10. A color detecting device for radiant energy comprising a source of radiant energy with a plurality of adjacent bands of frequencies extending over a predetermined range, means providing a control signal, means operated by said control signal for affecting the relative intensities of respective bands of frequencies of said radiant energy as a function of time in a predetermined cyclical pattern, and a signal phase detecting means for continuously receiving and instantly sensing the instantaneous total intensity of radiant energy affected by the cyclical pattern of said control signal and being responsive to the intensities of respective bands of frequencies of said radiant energy as a function of time.

11. A color detecting device for radiant energy comprising a source of radiant energy, energizing means for said source affecting the relative intensities of the frequencies of said radiant energy as a function of time, and detecting means for instantly continuously sensing the instantaneous total intensity of radiant energy of said source and being responsive to changes in the total intensity variation of said radiant energy as a function of time.

12. A color detecting device for radiant energy comprising a source of radiant energy, means for periodically affecting and continuously varying the relative intensities of the frequencies of said radiant energy, and detecting means for instantly continuously sensing the instantaneous total intensity of radiant energy and being responsive to changes in the periodic variation of the total intensity of said radiant energy.

13. A color detecting device for radiant energy comprising a source of radiant energy, control means energizing said source for periodically affecting the relative intensities of the frequencies of said radiant energy, and detecting means for receiving and instantly continuously sensing the instantaneous total intensity of radiant energy affected by said control means and being responsive to changes in the periodic variation of the total intensity of said radiant energy.

14. A color detecting device for radiant energy comprising a source of radiant energy, control means for continuously varying the distribution of the relative intensities of respective frequencies of said radiant energy in a predetermined periodic pattern, and detecting means for receiving and instantly continuously sensing the instantaneous total intensity of radiant energy affected by said control means and being responsive to changes in the periodic variation of the sum of the intensities of the respective frequencies of said radiant energy.

15. A color detecting device for radiant energy comprising a source of radiant energy with frequencies extending concurrently over a predetermined range, control means for varying in a continuous manner the distribution of the relative intensities of respective concurrent frequencies of said radiant energy as a function of time in a predetermined cyclical pattern, and detecting means for receiving and instantly continuously sensing the instantaneous total intensity of radiant energy affected by the cyclical pattern of said control means and being responsive to changes in the variation of the sum of the intensities of the respective frequencies of said radiant energy as a function of time.

16. A color detecting device for radiant energy comprising a source of radiant energy with a plurality of concurrent adjacent bands of frequencies extending over a predetermined range, control means for varying in an unequal and continuous manner the relative intensities of respective bands of frequencies of said radiant energy as a function of time in a predetermined cyclical pattern, and detecting means for receiving and instantly continuously sensing the instantaneous total intensity of radiant energy affected by the cyclical pattern of said control means and being responsive to changes in the variation of the sum of the intensities of respective bands of frequencies of said radiant energy as a function of time.

17. A color detecting device for radiant energy comprising a source of radiant energy with a plurality of adjacent bands of frequencies extending over a predetermined range, control means energizing said source for varying in a continuous manner the relative intensities of respective bands of frequencies of said radiant energy as a function of time in a predetermined cyclical pattern, the radiant energy of said source being adapted for interception and transmission by a material affecting the relative intensities of respective bands of frequencies in a manner characteristic of said material, and detecting means for receiving and instantly continuously sensing the instantaneous total intensity of radiant energy affected by the cyclical pattern of said control means and being responsive to changes in the variation of the sum of the intensities of respective bands of frequencies of said radiant energy as a function of time, said detecting means determining the selective frequency transmitting characteristics within said range for the particular material intercepting said radiant energy.

18. A device for detecting the color of a material comprising a source of radiant energy with frequencies corresponding to color bands extending concurrently over the luminous range, control means energizing said source for varying in an unequal and continuous manner the relative intensities of respective concurrent color bands as a function of time in a predetermined cyclical pattern, the radiant energy of said source being directed for interception and transmission by a material which is to have its color detected, said material affecting the relative intensities of said color bands in a manner characteristic of said material, and detecting means for continuously receiving and instantly continuously sensing the instantaneous total intensity of radiant energy affected by the cyclical pattern of said control means and the selective frequency transmitting characteristics of the particular material intercepting said radiant energy and being responsive to changes in the variation of the total intensity of the received radiant energy as a function of time for determining the color band transmitting characteristics of said material.

References Cited in the file of this patent

UNITED STATES PATENTS

| | | |
|---|---|---|
| 2,234,329 | Wolff | Mar. 11, 1941 |
| 2,444,560 | Feldt et al. | July 6, 1948 |
| 2,451,572 | Moore | Oct. 19, 1948 |
| 2,490,899 | Cohen | Dec. 13, 1949 |
| 2,500,547 | Kalmus et al. | Mar. 14, 1950 |
| 2,517,554 | Frommer | Aug. 8, 1950 |
| 2,519,154 | Schroeder et al. | Aug. 15, 1950 |
| 2,608,128 | Kelsey | Aug. 26, 1952 |
| 2,701,502 | Lukens | Feb. 8, 1955 |
| 2,710,559 | Heitmuller et al. | June 14, 1955 |
| 2,722,156 | Warren | Nov. 1, 1955 |
| 2,843,007 | Galey et al. | July 15, 1958 |